United States Patent [19]

Wilson

[11] Patent Number: 5,171,818

[45] Date of Patent: Dec. 15, 1992

[54] SPRAYABLE ALIPHATIC POLYUREA-POLYURETHANE COATING COMPOSITIONS AND METHODS

[75] Inventor: E. Lynn Wilson, 885 E. 500 North, Nephi, Utah 84648

[73] Assignees: Bruce Wilson, Bennion; E. Lynn Wilson, Nephi, Utah ; a part interest

[21] Appl. No.: 499,594

[22] Filed: Mar. 23, 1990

[51] Int. Cl.$^5$ .................... C08G 18/10; C08G 18/74; C08G 18/76

[52] U.S. Cl. ................................. 528/59; 528/60; 528/64; 528/68; 528/76; 528/77

[58] Field of Search .................. 528/59, 60, 64, 68, 528/76, 77

[56] References Cited

U.S. PATENT DOCUMENTS

| | | | |
|---|---|---|---|
| 3,236,895 | 2/1966 | Lee et al. | 528/60 |
| 3,475,266 | 10/1969 | Strassel | 27/40 |
| 4,028,310 | 6/1977 | Schafer et al. | 528/67 |
| 4,130,542 | 12/1978 | Chang et al. | 524/196 |
| 4,146,559 | 4/1979 | Bock et al. | 564/458 |
| 4,218,543 | 8/1980 | Weber et al. | 521/51 |
| 4,361,518 | 11/1982 | Singh et al. | 560/337 |
| 4,374,771 | 2/1983 | Singh et al. | 540/525 |
| 4,377,530 | 3/1983 | Trenbeath et al. | 560/337 |
| 4,396,729 | 8/1983 | Dominguez et al. | 521/51 |
| 4,397,767 | 8/1983 | Roberts et al. | 252/431 P |
| 4,399,073 | 8/1983 | Schaefer | 560/339 |
| 4,399,074 | 8/1983 | Schaefer | 560/339 |
| 4,414,174 | 11/1983 | Klempner et al. | 264/328.6 |
| 4,419,294 | 12/1983 | Feldman et al. | 560/334 |
| 4,420,600 | 12/1983 | Zavisza | 528/60 |
| 4,429,096 | 1/1984 | Schaefer | 526/287 |
| 4,433,067 | 2/1984 | Rice et al. | 521/51 |
| 4,439,616 | 4/1984 | Singh et al. | 560/25 |
| 4,444,910 | 4/1984 | Rice et al. | 521/51 |
| 4,448,904 | 5/1984 | Dominguez | 521/160 |
| 4,465,713 | 8/1984 | Lock et al. | 427/385.5 |
| 4,474,900 | 10/1984 | Dominguez | 521/110 |
| 4,474,901 | 10/1984 | Dominguez | 521/163 |
| 4,487,908 | 12/1984 | Dominguez | 528/48 |
| 4,487,912 | 12/1984 | Zimmerman et al. | 528/52 |
| 4,496,706 | 1/1985 | Chang | 528/57 |
| 4,499,254 | 2/1985 | Dominguez | 528/49 |
| 4,513,133 | 4/1985 | Dominguez | 528/49 |
| 4,515,933 | 5/1985 | Chang | 528/57 |
| 4,523,033 | 1/1985 | Bezwada | 528/58 |
| 4,525,568 | 1/1985 | Chang | 528/60 |
| 4,543,276 | 9/1985 | Parekh | 427/388.3 |
| 4,543,366 | 9/1985 | Smith | 524/874 |
| 4,546,167 | 10/1985 | Chang | 528/64 |
| 4,547,265 | 10/1985 | Forgione et al. | 162/164.6 |

(List continued on next page.)

OTHER PUBLICATIONS

Robert D. Cody, "TMXDI ® (META) Aliphatic Diisocyanate A Versatile Polyurethane Component".

Richard A. Davis et al., "m-TMXDI: An Isocyanate Which Does Not Cause Pulmonary Sensitization," *The Pharmacologist* 28(3), (1986).

Robin W. Dexter et al., "m-TMI, A Novel Unsaturated (List continued on next page.)

*Primary Examiner*—Morton Foelak
*Assistant Examiner*—Rabon Sergent
*Attorney, Agent, or Firm*—Workman, Nydegger & Jensen

[57] ABSTRACT

Sprayable aliphatic polyurea-polyurethane coating compositions and methods are disclosed. A quasi-prepolymer composition is prepared by mixing an aliphatic polyisocyanate with a stoichiometrically deficient quantity of polyol such that substantially all of the available hydroxyl groups of the polyol react with the isocyanate groups of the aliphatic polyisocyanate. Suitable catalysts may be used to accelerate the urethane bonding in the quasi-prepolymer compositon. The polymeric coating is preferably formed by reacting the quasi-prepolymer composition with a low molecular weight or a mixture of low and high molecular weight amine terminated polyether compounds. The amine terminated polyether compounds have amine groups capable of reacting with the unreacted isocyanate groups of the quasi-prepolymer Mixing of the quasi-prepolymer composition and the amine terminated polyether is preferably done at a sufficiently fast rate of result in a substantially homogeneous product. The currently preferred method of mixing is impingement mixing. The resulting mixture preferably has a sufficiently slow cure time such that the mixture is capable of being sprayed, but has a sufficiently fast cure time such that the mixture may be sprayed uniformly on non-horizontal surfaces.

33 Claims, No Drawings

U.S PATENT DOCUMENTS

| | | | |
|---|---|---|---|
| 4,547,478 | 10/1985 | Chang | 502/154 |
| 4,548,919 | 10/1985 | Megna | 502/154 |
| 4,556,702 | 12/1985 | Schaefer | 526/310 |
| 4,568,761 | 2/1986 | Henderson, Jr. | 560/24 |
| 4,570,012 | 2/1986 | Singh et al. | 560/25 |
| 4,582,887 | 4/1986 | Dominguez et al. | 528/48 |
| 4,585,850 | 4/1986 | Dominguez | 528/122 |
| 4,588,802 | 5/1986 | Chang | 528/58 |
| 4,598,103 | 7/1986 | Chang | 521/126 |
| 4,607,062 | 8/1986 | Megna | 521/124 |
| 4,607,090 | 8/1986 | Dominguez | 528/48 |
| 4,619,999 | 10/1986 | Parekh | 544/196 |
| 4,686,242 | 8/1987 | Turner et al. | 528/68 |
| 4,705,814 | 11/1986 | Grigsby et al. | 521/159 |
| 4,716,193 | 12/1987 | Grigsby, Jr. | 524/730 |
| 4,731,428 | 5/1988 | Waterman | 528/69 |
| 4,742,091 | 5/1988 | Grigsby et al. | 521/163 |
| 4,743,672 | 5/1988 | Goel | 528/60 |
| 4,748,192 | 5/1988 | Smith | 521/107 |
| 4,748,201 | 5/1988 | Smith | 524/712 |
| 4,754,011 | 6/1988 | Dexter et al. | 526/310 |
| 4,806,615 | 2/1989 | Rice et al. | 528/68 |
| 4,902,768 | 2/1990 | Gerkin et al. | 528/68 |
| 5,059,671 | 10/1991 | Taniguchi | 528/64 |
| 5,082,917 | 1/1992 | Su et al. | 528/60 |
| 5,106,935 | 4/1992 | Grigsby, Jr. et al. | 528/64 |

OTHER PUBLICATIONS

Aliphatic Isocyanate," *A Journal of Coatings Technology* Reprint.

Denise E. Fiori et al., "m-TMXDI/TMP Adduct: A New Aliphatic Isocyanate Cross-Linking Agent for the Coatings Industry," *Cyanamid*.

"The Jeffamine® Polyoxyalkyleneamines," Texaco Chemical Company (1987).

"Jeffamine® D-230 Polyoxypropylenediamine," *Specialty Chemicals*, Texaco Chemical Company (1988).

"Jeffamine® D-400 Polyoxypropylenediamine," *Specialty Chemicals*, Texaco Chemical Company (1988).

"Jeffamine® T-403 Polyoxyproplenetriamine," *Specialty Chemicals*, Texaco Chemical Company (1988).

"Jeffamine® D-2000 Polyoxypropylenediamine," *Specialty Chemicals*, Texaco Chemical Company (1988).

"Jeffamine® T-5000 [CAS 64852-22-8]," *Specialty Chemicals*, Texaco Chemical Company (1988).

ic compositions and to methods for coating surfaces with such compositions. More particularly, the present invention is directed to solvent free, aliphatic sprayable polyurea-polyurethane coatings which cure rapidly, remain stable in ultraviolet radiation, and are prepared substantially without solvents.

2. Technology Review

SPRAYABLE ALIPHATIC POLYUREA-POLYURETHANE COATING COMPOSITIONS AND METHODS

BACKGROUND

1. The Field of the Invention

The present invention relates to sprayable polymeric compositions and to methods for coating surfaces with such compositions. More particularly, the present invention is directed to solvent free, aliphatic sprayable polyurea-polyurethane coatings which cure rapidly, remain stable in ultraviolet radiation, and are prepared substantially without solvents.

2. Technology Review

Urethane polymers are generally prepared by reacting a polyol or polyol-based compound with an isocyanate, typically in the presence of a catalyst and a curing agent. Urea polymers are generally prepared by reacting a polyamine or polyamine-based compound with an isocyanate. The reaction between an amine and an isocyanate is sufficiently rapid such that a catalyst is not necessary.

Polyurethane coatings generally exhibit good water resistance, solvent resistance, gloss, and adhesion to metal substrates. Because of their useful physical properties, polyurethanes are widely used as coatings. A major problem with conventional polyurethane coatings is yellowing, loss of gloss, or other degradation upon exposure to ultraviolet light. Urethane ultraviolet light instability is often attributed to the use of aromatic isocyanates, such as MDI (methylene bis(4-phenylisocyanate), TDI (toluene 2,4-diisocyanate), or aromatic chain extenders such as DETDA (diethyl toluene diamine). Therefore, aromatic based polyurethane coatings are generally not recommended for exterior use.

It is possible to add pigments or ultraviolet stabilizers or inhibitors to the urethane coating to reduce the degradation effects of ultraviolet light. However, these additives have limited usefulness and tend to dissipate over time. Moreover, they add to the costs and complexity of the ultimate product.

Another possible solution to the problem of ultraviolet degradation of polyurethanes is the use of a protective coating. This approach has been used to protect hot tub covers from ultraviolet light. The base coating provides the desired polyurethane properties, such as waterproofing, and the protective coating shields the base coating from ultraviolet light.

Despite its advantages, this solution to the problem of ultraviolet degradation requires two coatings. The need for a second protective coating increases manufacturing costs from both time and materials. Thus, it is preferable to have a single coating system rather than two coating system.

Others have approached the problem of ultraviolet light instability by replacing the aromatic isocyanates with aliphatic compounds. Unfortunately, aliphatic isocyanates are generally slower reacting than aromatic isocyanates. Only a few aliphatic isocyanates possess a sufficiently high reactivity suitable for sprayable coatings. Moreover, in order to spray these polyurethane coatings, it has been necessary to add solvents to the components in order to have a sprayable viscosity.

A significant problem with solvent-based polymeric coatings is the formation of microscopic pinholes and channels in the coating upon evaporation of the solvent. As a result, the structural properties of the polymeric coating are less than ideal. Moreover, these volatile organic solvents are often flammable and toxic to both humans and the environment. In some cases, the solvents may chemically attack the substrate being coated. This is a common problem with solvent-based polymeric coatings applied to urethane foam substrates.

Sprayable polyurea compositions which are 100% solid (i.e., no solvents used) have been used in the reaction injection molding ("RIM") art. In RIM applications, usually two or more components are mixed and injected under high pressure into a mold where the polyurea composition solidifies. Polyurea compositions are typically more abrasion resistant than polyurethane compositions, presumably because of an additional nitrogen bond to the carbonyl carbon. Polyurea compounds are also thermally stronger and dimensionally more stable than polyurethanes.

However, sprayable polyurea compositions are generally more expensive than comparable polyurethane compositions because suitable polyamines needed to form the polyurea are more expensive than suitable polyols. Thus, due to cost constraints, the use of polyurea compositions has typically been limited to products formed in RIM processes.

From the foregoing, it will be appreciated that what is needed in the art are sprayable polyurea-polyurethane coating compositions which possess some of the physical properties of polyurea compositions, yet may be produced at a cost more comparable to polyurethane compositions. Additionally, it would be a significant advancement in the art to provide sprayable polyurea-polyurethane coating compositions and methods using aliphatic constituents such that the coating remains stable in ultraviolet light.

It would be a further advancement in the art to provide sprayable polyurea-polyurethane coating compositions which are substantially free of volatile solvents thereby resulting in a product which is substantially 100% solid. It would be yet another important advancement in the art to provide sprayable polyurea-polyurethane coating compositions which cure very rapidly, enabling the product to be uniformly sprayed on non-horizontal surfaces without running or streaking.

Such sprayable aliphatic polyurea-polyurethane coating compositions and methods are disclosed and claimed herein.

BRIEF SUMMARY AND OBJECTS OF THE INVENTION

The present invention is directed to sprayable aliphatic polyurea-polyurethane coating compositions and methods. The polymeric coating compositions within the scope of the present invention include both polyurea and polyurethane linkages. The polyurethane component is preferably formed during the preparation of a quasi-prepolymer composition. The quasi-prepolymer composition is prepared by mixing an aliphatic polyisocyanate with a stoichiometrically deficient quantity of polyol such that substantially all of the available hydroxyl groups (—OH) of the polyol react with the isocyanate groups (—NCO) of the aliphatic polyisocyanate. Urethane linkages are formed when the hydroxyl groups react with the isocyanate groups. Thus, the quasi-prepolymer composition comprises urethane linkages and unreacted isocyanate groups.

Suitable catalysts may be used to accelerate the urethane reaction in the quasi-prepolymer composition. Likewise, pigments for coloring the coating composition may be included in the quasi-prepolymer. The polyol preferably has a molecular weight greater than about 600. Polypropylene glycol is one currently preferred polyol; however, other polyfunctional high molecular weight alcohols known in the art may also be used.

The polyurea component of the polymeric coating is preferably formed by reacting the quasi-prepolymer composition with an amine terminated polyether. The amine terminated polyether has amine groups capable of reacting with the unreacted isocyanate groups of the quasi-prepolymer. Urea linkages are formed when the isocyanate groups react with the amine groups.

Mixing of the quasi-prepolymer composition and the amine terminated polyether is preferably done at a sufficiently fast rate to result in a substantially homogeneous product. The currently preferred method of mixing is impingement mixing. The resulting mixture preferably has a sufficiently slow cure time such that the mixture is capable of being sprayed. If the reaction time is too slow, then the product tends to run and streak when sprayed on non-horizontal surfaces. Conversely, if the reaction time it too fast, then the product cures (or partially cures) before being sprayed. A cure time within a few seconds is currently preferred.

The polyurea-polyurethane coating compositions within the scope of the present invention are preferably substantially aliphatic in order to have excellent stability in ultraviolet light. Although not required, the coating compositions of the present invention are preferably substantially free of volatile solvents which might form pits or channels upon evaporation or which might chemically react with the coating substrate. As a result, for many applications the polymeric coatings of the present invention are preferably substantially 100% solids. Finally, due to urea bonding the coating compositions of the present invention possess excellent tensile strength and abrasion resistance.

It is, therefore, an object of the present invention to provide sprayable polyurea-polyurethane coating compositions which possess physical properties of polyurea compositions, yet may be produced at a cost more comparable to polyurethane compositions. Another important object of the present invention is to provide sprayable polyurea-polyurethane coating compositions and methods which use aliphatic constituents such that the coating remains stable in ultraviolet light.

An additional object of the present invention is to provide sprayable polyurea-polyurethane coating compositions which are substantially free of volatile solvents thereby resulting in a product which is substantially 100% solid. A further important object of the present invention is to provide sprayable polyurea-polyurethane coating compositions which cure very rapidly enabling the product to be uniformly sprayed on non-horizontal surfaces without running or streaking.

These and other objects and features of the present invention will become more fully apparent from the following description and appended claims, or may be learned by the practice of the invention.

DETAILED DESCRIPTION OF THE PREFERRED EMBODIMENTS

The present invention provides sprayable aliphatic polyurea-polyurethane coating compositions and methods for coating surfaces with said compositions. The polymeric coating compositions within the scope of the present invention are preferably prepared by mixing a quasi-prepolymer composition having unreacted isocyanate groups with a suitable polyamine, and thereafter spraying the composition and allowing it to cure.

The quasi-prepolymer composition is preferably prepared by mixing an aliphatic polyisocyanate with a stoichiometrically deficient quantity of polyol such that substantially all of the available hydroxyl groups of the polyol react with the isocyanate groups of the aliphatic polyisocyanate. Urethane linkages are formed when the hydroxyl groups react with the isocyanate groups. Thus, the quasi-prepolymer composition comprises urethane linkages and unreacted isocyanate groups.

As used herein, the term "polyol" includes di- or greater functionality high molecular weight compounds having reactive hydrogen moieties. Suitable polyols used to prepare the quasi-prepolymer have a molecular weight greater than about 600, and preferably have a molecular weight in the range from about 2000 to about 5000. Polypropylene glycol and polytetramethylene glycol (sometimes referred to as "PTMG" or "PTMEG") are examples of currently preferred polyols. Besides alcohols, high molecular weight polyfunctional polyesters and polyamines known in the polyurethane art may also be used.

In most cases, the polyol will have a weight percent in the range from about 20% to about 65% of the quasi-prepolymer composition. Higher levels of polyol will produce generally softer elastomers with higher elongation. While lower levels of polyol generally produce harder elastomers.

Suitable catalysts may be used to accelerate the reaction between the isocyanate and hydroxyl groups in the quasi-prepolymer composition. Such catalysts, sometimes referred to as "urethane catalysts," are commonly used in the manufacture of urethane foams and coatings. Preferred catalysts are generally organo-metallic compounds containing tin, lead, zinc, or mercury. Dibutyl tin dilaurate is a typical tin catalyst known to produce suitable results within the scope of the present invention. Lead naphthanate and lead octoate are examples of lead catalysts which may be used.

It may also be necessary to heat the quasi-prepolymer composition to accelerate the urethane reaction. Such heating is preferably in the range from about 85° C. to about 120° C. for about 3 hours. If the quasi-prepolymer is heated much greater than about 120° C., or for significantly longer periods of time, then degradation of the polyol and polyisocyanate occurs.

Likewise, pigments for coloring the coating composition may be included in the quasi-prepolymer. Typical pigments include titanium dioxide ($TiO_2$), alumina compounds, and other pigments known in the art. One currently preferred pigment, known in the art as Ryvec White, is a 50%/50% by weight mixture of $TiO_2$ and 5000 molecular weight polyether triol. Ryvec White is particularly convenient because the pigment comes pre-wetted already in solution.

The aliphatic polyisocyanates are preferably a tetraalkyl xylene diisocyanate such as tetramethyl xylene diisocyanate (known as "TMXDI" and produced by American Cyanamid Company), having the following formula:

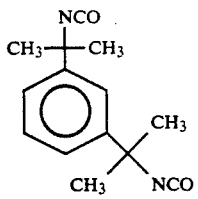

These compounds are characterized by having an aromatic ring with the isocyanate groups separated from the aromatic ring by at least one carbon atom. Because the isocyanate groups are bound to independent aliphatic radicals which are separated from the aromatic ring, the compounds have excellent stability under ultraviolet light.

TMXDI polyisocyanate is currently preferred because of its low toxicity compared to other polyisocyanates (both aromatic and aliphatic) used in the art. Another important advantage of TMXDI is its ability to form low viscosity quasi-prepolymers compared to other prepolymers in the art.

A stoichiometric excess of aliphatic polyisocyanate is reacted with the polyol to form the quasi-prepolymer. The aliphatic polyisocyanate preferably has a weight percent of the quasi-prepolymer composition in the range from about 30% to about 70%. The amount of reactive isocyanate is preferably balanced with the amount of reactive hydroxyl or amine groups of the polyol and with the amount of reactive amine in the polyamine such that upon final mixing, there is excess isocyanate. If there were excess amine, yellowing due to air oxidation or other degradation of the final product would be expected.

The polyurea component of the polymeric coating is preferably formed by reacting the quasi-prepolymer composition with a polyamine. Currently preferred polyamines are amine terminated polyethers, such as polyoxypropyleneamines, which have amine groups capable of reacting with the unreacted isocyanate groups of the quasi-prepolymer. Urea linkages are formed when the isocyanate groups react with the amine groups.

The ratio of equivalents of isocyanate groups (—NCO) in the polyisocyanate to the hydroxyl groups (—OH) and amine groups (—NH$_2$) in the polyol and in the polyamine is in the range from about 0.85:1 to about 1.30:1 with about 0.95:1 to about 1.15:1 being preferred and about 1.05:1 to about 1.15:1 being most preferred. This ratio is sometimes referred to as the isocyanate index and is expressed as a percentage of excess isocyanate. The isocyanate index compares the total isocyanate with the total hydroxyl and the total amine in the reactant compounds.

Mixing of the quasi-prepolymer composition and the amine terminated polyether is preferably done at a sufficiently fast rate to result in a substantially homogeneous product. The currently preferred method of mixing is impingement mixing. In impingement mixing two or more streams are impacted at a high velocity and the resulting turbulence provides intimate mixing very rapidly. Impingement mixing is known to those skilled in the art.

It is currently preferred that the impingement mixing occur at a pressure in the range from about 500 psi to about 3000 psi. The preferred pressure will vary depending on the components being mixed. The minimum acceptable pressure is the minimum pressure necessary to achieve an adequate mix and a good spray pattern. The maximum pressure will be determined by the spray equipment used.

The resulting mixture of quasi-prepolymer and amine terminated polyether preferably has a sufficiently slow cure time such that the mixture is capable of being sprayed. If the reaction time is too slow, then when the product is sprayed on non-horizontal surfaces, running and streaking of the coating results. Conversely, if the reaction time it too fast, then the product cures (or partially cures) before being sprayed. Typical tack-free cure times for compositions within the scope of the present invention range from a few seconds for hard elastomers to about 20 to 30 seconds for soft elastomers.

Although not a requirement of the invention, a blend of two or more different amine terminated polyether compounds are blended and mixed with the quasi-prepolymer composition. This blend preferably includes at least one amine terminated polyether compound having a molecular weight less than about 700 and another having a molecular weight greater than about 700. Those compounds having a molecular weight less than about 700 are referred to as the "hard segment," and those compounds having a molecular weight greater than about 700 are referred to as the "soft segment." The terms hard and soft segment are also used to describe the relative molecular weights of the polyols used to form the polymeric coatings within the scope of the present invention.

It has been found that as the amount of soft segment compounds in the coating composition increases, the softer the resulting coating becomes. Tensile strength and abrasion resistance is decreased, but elasticity is increased. Conversely, as the amount of hard segment increases, tensile strength and abrasion resistance increases, but elasticity decreases. Thus, it will be appreciated that those skilled in the art will be able to customize the physical characteristics of the sprayed coating by adjusting and balancing the relative amounts of hard and soft segments in the sprayed composition.

Because the polyurea-polyurethane coating compositions within the scope of the present invention are preferably substantially aliphatic, they have excellent stability in ultraviolet light. Although solvents may be used to prepare coating compositions within the scope of the present invention, in many cases the coating compositions of the present invention are preferably substantially free of volatile solvents which might form pits or channels upon evaporation or which might chemically react with the coating substrate. As a result, the polymeric coatings of the present invention are substantially 100% solids.

Various sprayable polymeric coating compositions and methods of coating a surface within the scope of the present invention will be further clarified by a consideration of the following examples, which are intended to be purely exemplary of the use of the invention and should not be viewed as a limitation on any claimed embodiment.

EXAMPLE 1

A sprayable polyurea-polyurethane coating was prepared as follows:

Quasi-Prepolymer Preparation

A quasi prepolymer was prepared by mixing the following ingredients:

|  | weight % | equivalent % | specific gravity |
|---|---|---|---|
| TMXDI | 35.00 | 0.2865 | 0.4200 |
| Ryvec White | 20.00 | 0.0100— | 0.3845 |
| PPG 2000 | 45.00 | 0.0450— | 0.4484 |
| Catalyst UL-8 | 0.001 | — | — |
|  | 100.001 | 0.2315 | 1.2529 |
|  |  | 0.2900 adjusted for specific gravity |  |

TMXDI is tetramethyl xylene diisocyanate (meta) produced by American Cyanamid Company. Ryvec White is TiO$_2$ pigment (50 weight percent) dispersed in a glycerol polyether (5000 molecular weight) solution. PPG 2000 is polypropylene glycol having a molecular weight of 2000. The catalyst used was an organo-tin carboxylate designed as a substitute for a conventional dibutyltin dilaurate catalyst.

The foregoing ingredients were heated and maintained at a temperature in the range from 85° C. to 95° C. for a period of three (3) hours. The equivalent percent was calculated by dividing the weight percent by the equivalent weight of the material.

Amine Terminated Polyether Blend

The following amine terminated polyether compounds were blended together:

|  | weight % | equivalent % |
|---|---|---|
| D-2000 | 50.00 | 0.0476 |
| T-5000 | 22.00 | 0.0114 |
| D-230 | 8.00 | 0.0696 |
| T-403 | 20.00 | 0.1489 |
|  | 100.00 | 0.2775 |
|  |  | 0.2747 adjusted for specific gravity |

D-2000, sold by Texaco Chemical Company under the tradename JEFFAMINE ®, is polyoxypropylenediamine having an average molecular weight of approximately 2000. Its amine groups are located on secondary carbon atoms at the ends of an aliphatic polyether chain. Approximately 97% of the total amine are primary amine. The amine hydrogen equivalent weight or "AHEW" is 514. D-2000 has the following structure:

$$H_2N-CH-CH_2[O-CH_2CH]_x NH_2$$
$$\phantom{H_2N-}CH_3 \phantom{-CH_2[O-CH_2CH]_x} CH_3$$
$$x = 33.1$$

T-5000, sold by Texaco Chemical Company under the tradename JEFFAMINE ®, is a primary polyether triamine having an average molecular weight of approximately 5000. Its amine groups are located on secondary carbon atoms at the ends of an aliphatic polyether chain. Approximately 97% of the total amine are primary amine. T-5000 has the following structure:

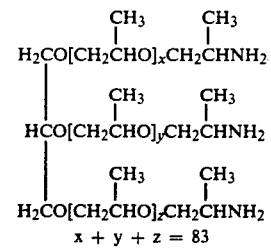

$$x + y + z = 83$$

D-230, sold by Texaco Chemical Company under the tradename JEFFAMINE ®, is a polyoxypropylenediamine having an average molecular weight of approximately 230. Its amine groups are located on secondary carbon atoms at the ends of an aliphatic polyether chain. Approximately 97% of the total amine are primary amine. The amine hydrogen equivalent weight or "AHEW" is 60. D-230 has the following structure:

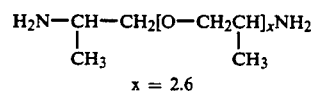

$$x = 2.6$$

T-403, sold by Texaco Chemical Company under the tradename JEFFAMINE ®, is a polyoxypropylenetriamine having an average molecular weight of approximately 440. Its amine groups are located on secondary carbon atoms at the ends of an aliphatic polyether chain. Approximately 90% of the total amine are primary amine. The amine hydrogen equivalent weight or "AHEW" is 81. T-403 has the following structure:

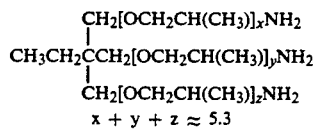

$$x + y + z \approx 5.3$$

The quasi-prepolymer and the amine terminated polyether blend were mixed by impingement mixing at 1400 psi and sprayed over two inches of foam on a roof in Gruver, Texas. The resulting coating composition had an isocyanate index of 5.5% meaning that the ratio of free isocyanate to amine was 1.055. The coating also had 31.5% hard segment and 68.5% soft segment. The average thickness of the coating was 48 mils. The coating was dry to the touch in less than 30 seconds.

EXAMPLE 2

A sprayable polyurea-polyurethane coating composition was prepared according to the procedure of Example 1 except that the following blend of amine terminated polyethers was used:

|  | weight % | equivalent % | specific gravity |
|---|---|---|---|
| D-2000 | 52.00 | 0.0495 | 0.4200 |
| T-5000 | 22.00 | 0.0114 | 0.2207 |
| D-230 | 8.00 | 0.0696 | 0.0758 |
| T-403 | 18.00 | 0.1340 | 0.1766 |
|  | 100.00 | 0.2645 | 0.9912 |
|  |  | 0.2622 adjusted for specific gravity |  |

The quasi-prepolymer and the amine terminated polyether blend were mixed by impingement mixing at 1500 psi and sprayed onto a surface and allowed to cure. The resulting coating composition had an isocyanate index of 10.6% meaning that the ratio of free isocyanate to amine was 1.106. The coating also had 30.5% hard segment and 64.5% soft segment, with 5% TiO₂ pigment.

The physical properties of the cured coating composition were determined and reported as follows:

| | |
|---|---|
| Average thickness, mils | 49.1 |
| Tensile strength, psi | 539 |
| Elongation, % | 292 |
| Tear, pli | 75.5 |
| Shore D Hardness | |
| 0 sec. | 15 |
| 10 sec. | 13 |
| Shore A Hardness | |
| 0 sec. | 47 |
| 10 sec. | 38 |
| 100% Modulus, psi | 276 |
| MVT, perms at 30 dry mils. | 0.106 |

EXAMPLE 3

A sprayable polyurea-polyurethane coating was prepared as follows:

Quasi-Prepolymer Preparation

A quasi prepolymer was prepared by mixing the following ingredients:

| | weight % | equivalent % | specific gravity |
|---|---|---|---|
| TMXDI | 52.7 | 0.4320 | |
| Ryvec White | 14.6 | 0.0073 | |
| PPG 2000 | 32.7 | 0.0327 | |
| Catalyst UL-8 | 0.001 | — | |
| | 100.001 | 0.3920 | 1.2385 |
| | | 0.4855 adjusted for specific gravity | |

Amine Terminated Polyether Blend

The following amine terminated polyether compounds were blended together:

| | weight % | equivalent % | specific gravity |
|---|---|---|---|
| D-2000 | 35.7 | 0.0340 | 0.3557 |
| T-5000 | 15.6 | 0.0081 | 0.1565 |
| D-230 | 28.2 | 0.2426 | 0.2673 |
| T-403 | 20.8 | 0.1549 | 0.2041 |
| | 100.00 | 0.4396 | 0.9836 |
| | | 0.4324 adjusted for specific gravity | |

The foregoing chemical constituents are described in Example 1. The quasi-prepolymer and the amine terminated polyether blend were mixed by impingement mixing at 1500 psi and sprayed onto a surface and allowed to cure. The resulting coating composition had an isocyanate index of 12% meaning that the ratio of free isocyanate to amine was 1.12. The coating also had 50.85% hard segment and 45.65% soft segment, with 3.5% TiO₂ pigment.

The physical properties of the cured coating composition were determined and reported as follows:

| | |
|---|---|
| Average thickness, mils | 47.1 |
| Tensile strength, psi | 1634 |
| Elongation, % | 326 |
| Tear, pli | 283 |
| Shore D Hardness | |
| 0 sec. | 38 |
| 10 sec. | 31 |
| 100% Modulus, psi | 875 |
| 300% Modulus, psi | 1505 |
| MVT, perms at 30 dry mils. | 0.0578 |
| Abrasion resistance wt. loss, mg (1000 gms, 1000 rev, H-18 wheels) | 190 |

EXAMPLE 4

A sprayable polyurea-polyurethane coating composition is prepared according to the procedure of Example 1 except that polytetramethylene glycol having an average molecular weight of 2000 is used instead of the polypropylene glycol. The resulting coating possesses excellent abrasion resistance.

EXAMPLE 5

A sprayable polyurea-polyurethane coating composition is prepared according to the procedure of Example 4 except that surface modified, ultra-high molecular weight powdered polyethylene obtained from Air Products and Chemicals, Allentown, Pa. is added to the quasi-prepolymer composition prior to spraying. The powdered polyethylene is specially designed for adding to polyurethane elastomers. It has a built in reactive linkage which chemically bonds to the urethane bonds during polymerization. The resulting elastomeric coating has a slick surface possessing excellent abrasion resistance.

EXAMPLE 6

A sprayable polyurea-polyurethane coating composition is prepared according to the procedure of Example 5 except that the surface modified, ultra-high molecular weight powdered polyethylene was blended with the amine terminated polyether compounds prior to spraying. The resulting elastomeric coating has a slick surface possessing excellent abrasion resistance.

EXAMPLE 7

A sprayable polyurea-polyurethane coating composition is prepared according to the procedure of Example 5 except that polypropylene glycol having an average molecular weight of 2000 is used instead of the polytetramethylene glycol. The resulting elastomeric coating has a slick surface possessing excellent abrasion resistance.

Although the foregoing discussion has focused on a sprayable polyurea-polyurethane coating composition, the principles of the present invention may be modified to produce a sprayable polyurea coating composition. By replacing the polyol with polyamines (preferably amine terminated polyether compounds described herein) of a comparable molecular weight, a suitable quasi-prepolymer composition may be prepared. An important advantage of preparing the quasi-prepolymer composition with a polyamine rather than a polyol is that catalysts and heating are not needed. In addition, the quasi-prepolymer composition may be prepared in a matter of minutes rather than hours.

A quasi-prepolymer prepared with a polyamine may be used in the same manner as one prepared with a polyol. However, due to the high cost of suitable polyamines, it is currently preferred to prepare quasi-prepolymers with polyols.

The sprayable polymeric coating compositions within the scope of the present invention may be used in a variety of settings For instance, in roofing applications the coating compositions may be sprayed directly onto plywood. The coatings have excellent weatherability and are not damaged by hail. In addition, snow simply slides off roofs coated with the polymeric coating compositions of the present invention. The present invention has also been used successfully to coat the walls of handball courts.

Coating compositions disclosed herein may also be advantageously used to prepare and line molds. For instance, the present coating compositions are an excellent replacement for RTV silicones used in preparing flexible molds taken from a master that replicate exacting detail onto molded pieces.

The coating compositions within the scope of the present invention can also be prepared with excellent abrasion resistant properties. Such coatings may be used to coat machinery which is subjected to heavy abrasion. Typical uses are in mining, milling, and cement manufacturing industries which subject equipment to abrasive forces.

From the foregoing, it will be appreciated that the present invention provides sprayable polyurea-polyurethane coating compositions which possess important physical properties of polyurea compositions, such as strength, elongation, abrasion and flammability resistance, high temperature stability, yet may be produced at a cost more comparable to polyurethane compositions. The present invention also provides sprayable polyurea-polyurethane coating compositions and methods which use aliphatic constituents such that the coating remains stable in ultraviolet light.

It will be further appreciated that the present invention provides sprayable polyurea-polyurethane coating compositions which are substantially free of volatile solvents thereby resulting in a product which is substantially 100% solid. As a result, the coatings have excellent waterproofing characteristics. In addition, the sprayable polyurea-polyurethane coating compositions of the present invention are able to cure very rapidly, in a matter of seconds, thereby enabling the compositions to be uniformly sprayed on non-horizontal surfaces without running or streaking.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A polyurea-polyurethane coating prepared by a process comprising the steps of:
   (a) preparing a quasi-prepolymer composition by mixing a quantity of a tetraalkyl xylene diisocyanate with a stoichiometrically deficient quantity of polyol having a molecular weight greater than about 600, said tetraalkyl xylene diisocyanate reacting with said polyol such that substantially all of the available hydroxyl groups of the polyol react with the isocyanate groups of the tetraalkyl xylene diisocyanate to form the quasi-prepolymer composition, the quasi-prepolymer having a sufficiently low viscosity to allow the quasi-prepolymer to be mixed together and sprayed through a device that can achieve a spray;
   (b) impingement mixing the quasi-prepolymer composition with an amine terminated polyether having amine groups capable of reacting with unreacted isocyanate groups of the quasi-prepolymer composition, said impingement mixing being performed at a sufficiently fast rate to result in a substantially homogenous mixture, in which the unreacted isocyanate groups of the quasi-prepolymer composition react with the amine terminated polyether at a rate sufficiently slow such that the homogenous mixture is capable of being sprayed;
   (c) spraying the homogenous mixture with the spraying device onto a surface; and
   (d) allowing the homogenous mixture to cure and form the polyurea-polyurethane coating.

2. A polyurea-polyurethane coating prepared by a process defined in claim 1 wherein the tetraalkyl xylene diisocyanate has a weight percent of the quasi-prepolymer composition in the range from about 30% to about 70%.

3. A polyurea-polyurethane coating prepared by a process defined in claim 1 wherein the tetraalkyl xylene diisocyanate comprises tetramethylxylene diisocyanate.

4. A polyurea-polyurethane coating prepared by a process defined in claim 1 wherein the polyol comprises polypropylene glycol.

5. A polyurea-polyurethane coating prepared by a process defined in claim 1 wherein the polyol comprises polypropylene glycol having a molecular weight in the range from about 2000 to about 5000.

6. A polyurea-polyurethane coating prepared by a process defined in claim 1 wherein the isocyanate index is in the range from about 0.85:1 to about 1.30:1.

7. A polyurea-polyurethane coating prepared by a process defined in claim 1 wherein the isocyanate index is in the range from about 0.95:1 to about 1.15:1.

8. A polyurea-polyurethane coating prepared by a process defined in claim 1 wherein the isocyanate index is in the range from about 1.05:1 to about 1.15:1.

9. A polyurea-polyurethane coating prepared by a process defined in claim wherein the quasi-prepolymer composition further comprises a catalyst to facilitate the reaction between the hydroxyl groups of the polyol and the isocyanate groups of the tetraalkyl xylene diisocyanate.

10. A polyurea-polyurethane coating prepared by a process defined in claim 9 wherein the catalyst comprises an organo-metallic catalyst.

11. A polyurea-polyurethane coating prepared by a process defined in claim 10 wherein the organo-metallic catalyst comprises an organo-tin catalyst.

12. A polyurea-polyurethane coating prepared by a process defined in claim 11 wherein the organo-tin catalyst comprises dibutyl tin dilaurate.

13. A polyurea-polyurethane coating prepared by a process defined in claim 10 wherein the organo-metallic catalyst comprises an organo-lead catalyst.

14. A polyurea-polyurethane coating prepared by a process defined in claim 1 wherein the quasi-prepolymer composition further comprises a pigment for coloring the coating.

15. A polyurea-polyurethane coating prepared by a process defined in claim 14 wherein the pigment comprises TiO$_2$.

16. A polyurea-polyurethane coating prepared by a process defined in claim 1 wherein the step of mixing the quasi-prepolymer composition with the amine terminated polyether is achieved by impingement mixing at a pressure in the range from about 500 psi to about 3000 psi.

17. A polyurea-polyurethane coating prepared by a process defined in claim 1 wherein the amine terminated polyether mixed with the quasi-prepolymer composition comprises a polyoxypropylene polyamine compound having a molecular weight less than about 700.

18. A polyurea-polyurethane coating prepared by a process defined in claim 1 wherein the amine terminated polyether mixed with the quasi-prepolymer composition comprises a polyoxypropylene polyamine compound having a molecular weight less than about 700 and a polyoxypropylene polyamine compound having a molecular weight greater than about 700.

19. A polyurea-polyurethane coating prepared by a process defined in claim wherein the quasi-prepolymer composition is substantially solvent-free.

20. A polyurea-polyurethane coating prepared by a process defined in claim 1 wherein the amine terminated polyether is substantially solvent-free.

21. A method of preparing a sprayed polyurea-polyurethane coating comprising the steps of:
  (a) preparing a quasi-prepolymer composition having a sufficiently low viscosity to allow the quasi-prepolymer to be mixed together and sprayed through a spring device, said preparing step comprising the steps of:
    mixing a tetraalkyl xylene diisocyanate having a weight percent in the range from about 30% to about 70% of the prepolymer composition with polypropylene glycol having a weight percent in the range from about 20% to about 60% of the quasi-prepolymer composition to form a mixture;
    adding a catalyst to the mixture to facilitate the reaction between the hydroxyl groups of the polypropylene glycol and the isocyanate groups of the tetraalkyl xylene diisocyanate; and
    heating the mixture to a temperature in the range from about 85° C. to about 120° C. until substantially all of the available hydroxyl groups of the polypropylene glycol react with the isocyanate groups of the tetraalkyl xylene diisocyanate;
  (b) obtaining a blend of amine terminated polyether compounds having amine groups capable of reacting with unreacted isocyanate groups of the quasi-prepolymer composition, said blend of amine terminated polyether compounds comprising an amine terminated polyether compound having a molecular weight less than about 700 and an amine terminated polyether compound having a molecular weight greater than about 700;
  (c) impingement mixing the quasi-prepolymer and the amine terminated polyether compounds at a pressure in the range from about 500 psi to about 3,000 psi; and
  (d) spraying the quasi-prepolymer and the blend of amine terminated polyether compounds with the spraying device onto a surface.

22. A method of preparing a sprayed polyurea-polyurethane coating as defined in claim 21 wherein the tetraalkyl xylene diisocyanate comprises tetramethylxylene diisocyanate.

23. A method of preparing a sprayed polyurea-polyurethane coating as defined in claim 21 wherein the polypropylene glycol has a molecular weight in the range from about 2000 to about 5000.

24. A method of preparing a sprayed polyurea-polyurethane coating as defined in claim 21 wherein the catalyst comprises an organo-metallic catalyst.

25. A method of preparing a sprayed polyurea-polyurethane coating as defined in claim 24 wherein the organo-metallic catalyst comprises an organo-tin catalyst.

26. A method of preparing a sprayed polyurea-polyurethane coating as defined in claim 25 wherein the organo-tin catalyst comprises dibutyl tin dilaurate.

27. A method of preparing a sprayed polyurea-polyurethane coating as defined in claim 24 wherein the organo-metallic catalyst comprises an organo-lead catalyst.

28. A method of preparing a sprayed polyurea-polyurethane coating as defined in claim 22 wherein the quasi-prepolymer composition further comprises a pigment for coloring the coating.

29. A method of preparing a sprayed polyurea-polyurethane coating as defined in claim 28 wherein the pigment comprises TiO$_2$.

30. A method of preparing a sprayed polyurea-polyurethane coating as defined in claim 21 wherein the quasi-prepolymer composition is substantially solvent-free.

31. A method of preparing a sprayed polyurea-polyurethane coating as defined in claim 21 wherein the amine terminated polyether is substantially solvent-free.

32. A polyurea coating prepared by a process comprising the steps of:
  (a) preparing a quasi-prepolymer composition by mixing a quantity of tetramethylxylene diisocyanate with a stoichiometrically deficient quantity of a polyoxypropylene polyamine composition having a molecular weight greater than about 700, said tetramethylxylene diisocyanate reacting with said polyoxypropylene polyamine such that substantially all of the available amine groups of the polyoxypropylene polyamine react with the isocyanate groups of the tetramethylxylene diisocyanate to form the quasi-prepolymer composition, the quasi-prepolymer having a sufficiently low viscosity to allow the quasi-prepolymer to be mixed together and sprayed through a spraying device, the viscosity of the quasi-prepolymer being controlled without the use of solvents;
  (b) mixing the quasi-prepolymer composition with a blend of at least two polyoxypropylene-amine compounds having amine groups capable of reacting with unreacted isocyanate groups of the quasi-prepolymer composition, said blend of at least two polyoxypropylene polyamine compounds comprising a polyoxypropylene polyamine compound having a molecular weight less than about 700 and a polyoxypropylene polyamine compound having a molecular weight greater than about 700, said mixing being performed at a sufficiently fast rate to result in a substantially homogeneous mixture, in which the unreacted isocyanate groups of the quasi-prepolymer composition react with amine groups of the polyoxypropylene polyamine compounds at a rate sufficiently slow such that the homogeneous mixture is capable of being sprayed;

(c) spraying the homogeneous mixture onto a surface with the spraying device; and (d) allowing the homogeneous mixture to cure and form the polyurea coating.

33. A method of preparing a sprayed polyurea coating comprising the steps of:

(a) preparing a quasi-prepolymer composition by mixing tetramethylxylene diisocyanate having a weight percent in the range from about 30% to about 70% of the quasi-prepolymer composition with a polyoxypropylene polyamine composition having a molecular weight greater than about 700 and having a weight percent in the range from about 30% to about 70% of the quasi-prepolymer composition such that substantially all of the available amine groups of the polyoxypropylene polyamine react with the isocyanate groups of the diisocyanate, the quasi-prepolymer having a sufficiently low viscosity to allow the quasi-prepolymer to be mixed together and sprayed through a spraying device;

(b) obtaining a blend of at least two polyoxypropylene polyamine compounds having amine groups capable of reacting with unreacted isocyanate groups of the quasi-prepolymer composition, said blend of at least two polyoxypropylene polyamine compounds comprising a polyoxypropylene polyamine compound having a molecular weight less than about 700 and a polyoxypropylene polyamine compound having a molecular weight greater than about 700;

(c) impingement mixing the quasi-prepolymer composition and the polyoxypropylene polyamine compounds at a pressure in the range from about 500 psi to about 3000 psi; and (d) spraying a the quasi-prepolymer and the polyoxypropylene polyamine mixture with the spraying device onto a surface.

* * * * *

UNITED STATES PATENT AND TRADEMARK OFFICE
CERTIFICATE OF CORRECTION

PATENT NO. : 5,171,818
DATED : December 15, 1992
INVENTOR(S) : E. LYNN WILSON It is certified that error appears in the above-identified patent and that said Letters Patent is hereby corrected as shown below:

```
Abstract, line 17, after "quasi-prepolymer" insert --,--
Abstract, line 20, "of result" should be --to result--
Column 1, line 55, after "than" insert --a--
Column 3, line 26, "it" should be --is--
Column 4, line 33, delete ". while" and insert --while--
Column 11, line 10, after "settings" insert --,--
Column 13, line 25, after "claim" insert --1--
```

Signed and Sealed this

Twelfth Day of April, 1994

*Attest:*

BRUCE LEHMAN

*Attesting Officer*

*Commissioner of Patents and Trademarks*